March 12, 1940. R. E. CROSSLEY 2,193,272
FLOODLIGHT
Original Filed April 30, 1937 2 Sheets—Sheet 1

INVENTOR.
Royal E. Crossley
BY Bodell & Thompson
ATTORNEYS.

March 12, 1940.  R. E. CROSSLEY  2,193,272
FLOODLIGHT
Original Filed April 30, 1937  2 Sheets-Sheet 2
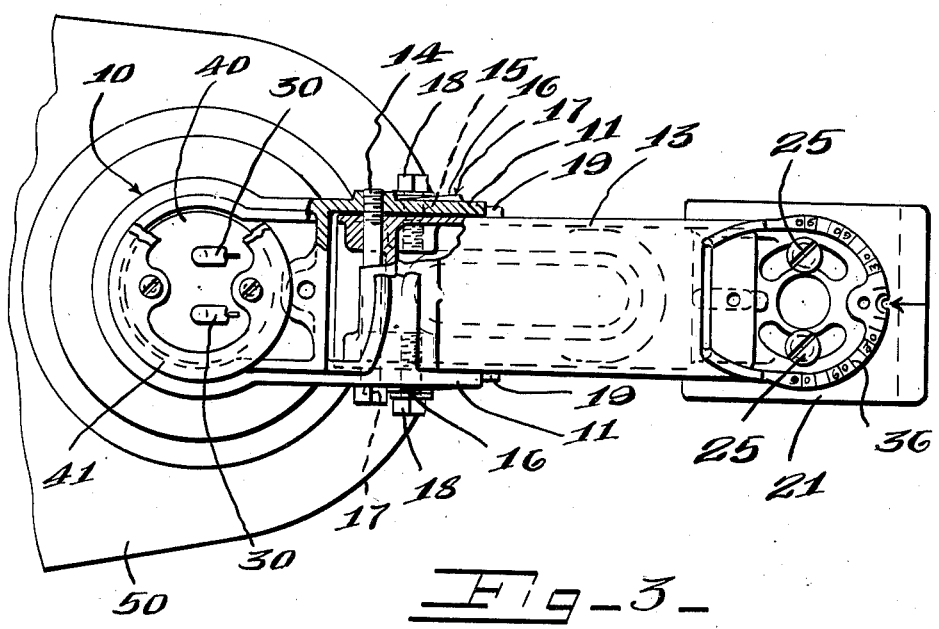
Fig-3-
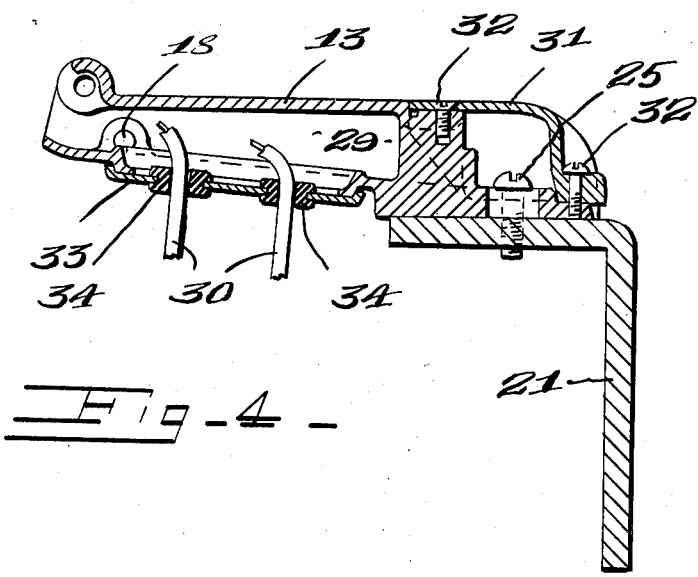
Fig-4-
INVENTOR.
Royal E. Crossley
BY Bedell & Thompson
ATTORNEYS.

Patented Mar. 12, 1940

2,193,272

UNITED STATES PATENT OFFICE 2,193,272

FLOODLIGHT

Royal E. Crossley, Fayetteville, N. Y., assignor to Crouse-Hinds Company, Syracuse, N. Y., a corporation of New York Application April 30, 1937, Serial No. 139,995
Renewed March 30, 1939

7 Claims. (Cl. 240—67)

This invention relates to lighting fixtures of the floodlight type, and has as an object a floodlight construction including a supporting bracket member and a housing proper adjustably mounted on the bracket, and means by which the housing, when adjusted to the desired position, may be firmly secured to the bracket and will not become loosened by vibration, or the like.

The invention has as a further object, a floodlight of particularly economical and efficient construction which may be conveniently wired and assembled or disassembled for the replacement of parts.

The invention consists in the novel features and in the combinations and constructions hereinafter set forth and claimed.

In describing this invention, reference is had to the accompanying drawings in which like characters designate corresponding parts in all the views.

Figure 3 is a top, plan view of the structure shown in Figure 1, with the housing cap removed, and parts broken away.

Figure 4 is a vertical, sectional view through the bracket member showing a different form of mounting.

Figure 1:
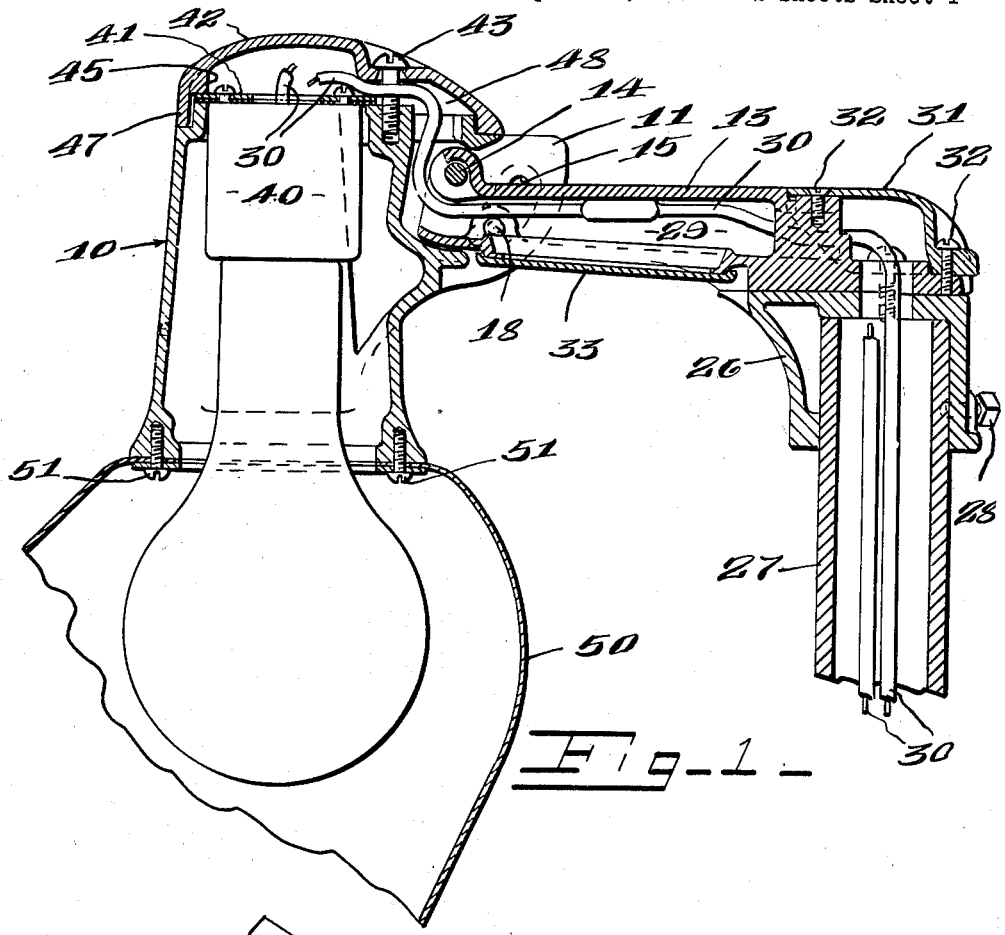
Figure 1 is a vertical, sectional view of a floodlight embodying my invention.
Figure 2:
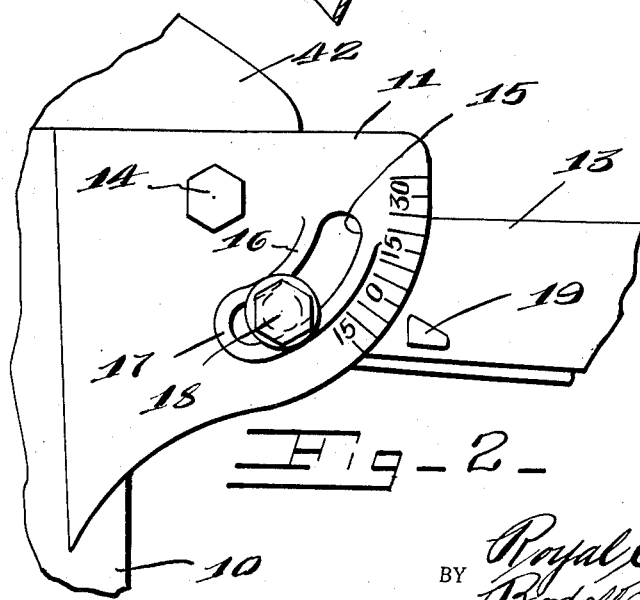
Figure 2 is an enlarged, fragmentary, side elevational view of the floodlight structure relating to the adjustment of the housing.

The present embodiment of my invention comprises a tubular housing 10 preferably formed of cast metal, such as aluminum, and provided with a pair of spaced apart flanges 11. The housing 10 is adjustably mounted on one end of a bracket 13 on a horizontal axis 14, here shown in the nature of a bolt extending through the flanges 11, and the outer end of the bracket 13. The flanges 11 overlap sides of the bracket 13 and are formed with arcuate slots 15 arranged concentrically with the pivot 14. The outer sides of the flanges 11 are also formed with cam surfaces 16 which project outwardly at one end of the slot 15, as at 17, and merge with the outer surface of the flange 11 adjacent the opposite end of the slot, and the cam surfaces 16 extend in opposite directions. That is, the high portion of the cam surface on one flange is arranged adjacent the bottom of the arcuate slot, and on the other flange adjacent the top of the slot.

The structure further includes clamping means carried by the bracket 13, and is here shown in the nature of cap screws 18 extending through the slots 15 and threading into the sides of the bracket 13, with the head of the screw engaging the cam surfaces 16.

From the description thus far, it will be apparent that upon loosening of the cap screws 18, the housing 10 may be adjusted about the pivot 14, and for this purpose a portion of the peripheral edge of one or both flanges is graduated, and the sides of the bracket 13 provided with an indicator 19 to facilitate accurate adjustment. After the housing has been adjusted to the desired position, the cap screws 18 are tightened and the housing thus held against relative movement.

Floodlights are usually mounted on poles or like structure, and are subject to considerable vibration by the wind, and to mechanical vibration where they are mounted on oil derricks, and like apparatus. In the present structure, due to the changes of temperature, the housings have a tendency to become loosened, and move out of adjusted position. Such movement is prevented by the structure described, due to the fact that the cam surfaces act as wedges, and any tendency of the housing to move in one direction is prevented by one cam surface, and movement in the opposite direction is prevented by the other cam surface. Any loosening of the cap screws, due to expansion from temperature change, is immediately taken up by the cam surfaces, whereas in previous structures once the adjusting screws become slightly loosened, there is nothing to prevent them from working entirely out of the bracket and, of course, in the meantime the housing has swung out of adjusted position.

The bracket 13 may be secured directly to a flat support, such as an angle iron 21, Figure 4, by means of one or more screws 25, or may be secured to a base member 26 mounted upon the end of a pipe or conduit 27, and secured thereto by means of set screws 28.

The bracket 13 is formed with a lengthwise extending passage 29 to permit lead wires 30 to be carried from the conduit 27 through the bracket and into the housing 10. The rear portion of the bracket is provided with a detachable cap 31 secured to the bracket by means of screws 32. Where the bracket is mounted upon a flat surface, as illustrated in Figure 4, the lead wires 30 are brought into the bracket through a cover 33 detachably secured to the under side of the bracket and provided with one or more insulating bushings 34.

In order to facilitate adjustment of the bracket on a vertical axis, the rear end of the bracket is provided with graduations 36 which are visible when the cap 31 is removed. When the base 26 is employed, adjustment on the vertical axis may be obtained by rotating the base 26 on the end of the conduit 27.

A lamp receptacle 40 is detachably mounted in the housing 10, and as here shown is carried by a receptacle supporting plate 41, the peripheral margin of which overlaps the upper end of the housing. A cap or closure 42 is detachably secured to the upper end of the housing by means of one or more screws 43, and is provided with a plurality of inwardly extending ribs 45 coacting with the receptacle supporting plate 41 to clamp the same against the upper end of the housing, and the cap 42 is formed with a depending annular flange 47 encircling the upper end of the housing and acting as a barrier against the entrance of dirt and moisture. The cap 42 extends rearwardly over the flanges 11 and the contiguous end of the bracket 13, and provides a passage 48 through which the lead wires 30 are passed to the receptacle 40. The fixture is completed by a suitable shade or reflector 50 detachably secured to the lower end of the housing 10 as by screws 51.

It will be observed that the construction described is particularly economical and may be conveniently installed, wired and assembled. The socket 40 may be readily replaced by removing the cap 42 and disconnecting the ends of the lead wires 30 from the terminals of the receptacle 40.

What I claim is:

1. A floodlight comprising a supporting bracket, a housing pivoted on a horizontal axis to the end of said bracket, said housing being formed with spaced apart flanges overlapping the sides of said bracket, each of said flanges being formed with an arcuate slot having a marginal cam surface, the cam surface on one of said flanges merging with said flange at the upper end of said arcuate slot, and the cam surface on the other flange merging therewith at the lower end of said arcuate slot, a screw extending through each of said slots and threading into said bracket with the head portion of the screw engaging said cam surface, a receptacle supporting plate arranged in the upper end of said housing, and a cap detachably secured to the upper end of the housing and being cooperable to detachably secure said plate in the housing.

2. A floodlight comprising a supporting bracket, a housing pivoted on a horizontal axis to the end of said bracket, said housing being formed with spaced apart flanges overlapping the sides of said bracket, each of said flanges being formed with an arcuate slot arranged concentric with said pivot axis and being also formed on their outer sides with cam surfaces adjacent the margin of said slots, said surfaces extending outwardly at one end of the slot and merging with the flange at the opposite end of the slot, said cam surface on one flange extending in opposite direction to the cam surface on the other flange, clamping means carried by said bracket and extending through said slots and being operable to engage said cam surfaces to maintain the housing in adjusted position.

3. A floodlight comprising a supporting bracket, a housing pivotally mounted on a horizontal axis to one end of said bracket and being adjustable relative to said bracket about said axis, said housing being formed with spaced apart flanges extending on each side of said bracket, each of said flanges being formed with an arcuate slot arranged concentric with said pivot axis and being also formed on their outer sides with cam surfaces against the margin of said slots, the cam surfaces on one flange extending in opposite direction to the cam surface on the other flange, clamping means carried by said bracket and extending through said slots and being operable to engage said cam surfaces to maintain the housing in adjusted position.

4. A floodlight comprising a supporting bracket, a housing pivoted to one end of the bracket on a horizontal axis and being adjustable relative to said bracket, said housing being provided with spaced apart flanges extending on each side of said bracket and being formed with arcuate slots arranged concentric with said pivot axis, and said flanges being also formed on their outer sides with cam surfaces adjacent the margin of said slots, said cam surfaces extending outwardly at one end of the slot and merging with the flange at the opposite end of the slot, with the cam surface on one flange extending in opposite direction to the cam surface on the other flange, clamping means carried by the bracket and extending through said slots and being operable to engage said cam surfaces and secure the housing to the bracket.

5. A floodlight comprising a supporting bracket, a housing pivotally mounted on a horizontal axis to one end of the bracket and being formed with a flange extending on each side of said bracket, each of said flanges being formed with an arcuate slot arranged concentrically of said pivot axis and each flange being also formed on its outer side with a cam surface, the cam surface on one flange tapering in opposite direction to the cam surface on the other flange, a screw extending through each of said slots and threading into said bracket with the head portion of the screw engaging the contiguous cam surface and being operable when tightened to secure said housing from movement relative to said bracket.

6. A floodlight comprising a supporting bracket member and a housing member pivotally mounted on said bracket, one of said members being formed with spaced apart flanges overlapping the sides of the other member, each of said flanges being formed with an arcuate slot arranged concentric with said pivot axis, and each of said flanges being formed with a cam surface extending along the marginal edges of said slot, the cam surface on one of said flanges merging with said flange at the upper end of said arcuate slot, and the cam surface on the other flange merging therewith at the lower end of said arcuate slot, clamping means extending through said slots and being operable to engage said cam surfaces to maintain said members in adjusted position.

7. A floodlight comprising a supporting bracket member and a housing member pivotally mounted on said bracket, one of said members being formed with a cam surface on each side thereof, said cam surface being arranged substantially concentric with the pivot axis of said members, the cam surface on one side of said member extending in opposite direction to the cam surface on the opposite side of said member, a screw threading into each side of said other member, said screws engaging respectively with said cam surfaces and being cooperable therewith to prevent pivotal movement of said housing in both directions relative to said bracket.

ROYAL E. CROSSLEY.